Patented June 28, 1949

2,474,440

UNITED STATES PATENT OFFICE 2,474,440

PROCESS FOR THE PRODUCTION OF A LITHIUM-ALUMINUM COMPOUND AS A BASE FOR A CONVERSION CATALYST

Albert E. Smith and Otto A. Beeck, Berkeley, Calif., assignors to Shell Development Company, San Francisco, Calif., a corporation of Delaware No Drawing. Application March 3, 1947, Serial No. 732,129

15 Claims. (Cl. 260—683.3)

1

This application is a continuation-in-part of our copending application Serial No. 463,306 filed October 23, 1942, now abandoned.

The invention relates to new and improved catalysts, and to the method for their preparation. The invention also relates to the execution of various catalytic conversions with the new and improved catalysts.

An object of the invention is to provide new catalysts which may be employed in various processes over long periods of time with a minimum loss of catalytic activity. A further object of the invention is to provide new and improved catalysts which may be subjected to higher temperatures without loss in catalytic activity. A further object of the invention is to provide new and improved catalysts which are especially advantageous for use in processes involving periodic regeneration of the catalyst by burning carbonaceous deposits therefrom. A further object is to provide a method for the practical production of the new catalysts. A still further object of the invention is to improve various catalytic conversions, and particularly those of the short cycle regenerative type, by the use of the new catalysts.

The new and improved catalysts of the invention are catalysts of the supported type, i. e. in which a relatively active catalytic promoter material is supported on the surface of a solid microporous carrier substance. They are prepared by depositing lithium oxide on the surface of an adsorptive alumina, reacting the deposited lithium oxide with the alumina at a temperature above 700° C. but below that causing fusion for a time sufficient to convert at least the surface into lithium-alumina spinel of the formula $Li_2O \cdot 5Al_2O_3$, washing the product to remove unreacted lithium oxide, thereby to produce an adsorptive aluminous base material having a surface of at least 30 square meters per gram and being of said spinel and free of uncombined lithium oxide, and then depositing the catalytically active promoter upon the preformed surface of said lithium-alumina spinel.

In recent years great progress has been made in the execution of various conversions by the application of solid catalysts. It has been found that a great many of the known inorganic compounds are capable of catalyzing one conversion or another. Although there are notable exceptions, the large majority of the more active catalytic materials are found among the metals and their compounds. Many of these, such in particular as the metals capable of existing in a plurality of valence states, are capable of catalyzing a number of different conversions, especially if they are used in various combinations. Of the many catalytic compounds, the oxides,

2 sulfides and halides are generally the most active, but many other compounds, such as the chromates, chromites, tungstates, molybdates, phosphates, phosphites, borates, etc., are not infrequently employed.

A great many of these elements and compounds known to have catalytic properties have one or more undesirable characteristics such as small available surface per unit volume, insufficient mechanical strength, thermal instability, lack of availability, etc., which make them unfit for practical application in their usual form. These catalytic agents may often be employed very advantageously, however, if they are applied to a suitable carrier or supporting material. Also, nearly all of the catalytic agents which are, per se, suitable catalysts, are greatly improved when applied on a suitable carrier or support.

One function of the carrier is to increase the available catalytic surface. In conversions executed with the aid of solid catalysts, the reactions take place predominantly at the fluid-solid interface. This is indicated by the fact that at temperatures above a certain threshold temperature, the reaction rate is more or less proportional to the available catalyst surface in the reaction zone. It is known that certain substances have, besides the usual exterior surface, a minute porous structure, and have therefore a large inner surface. Substances having large inner surfaces are generally active, i. e. adsorptive, and it can be shown that the adsorptive ability of such solids is generally more or less proportional to the inner surface. When the various catalytic agents are deposited upon such carrying materials, an enormous catalytic surface is provided.

For most catalytic conversions, catalysts of this type are desired. There are, however, notable exceptions. In view of the fine porous structure of such catalysts, diffusion of the reactants through the catalyst is slow and, consequently, a part at least of the reactant is in contact with the catalyst for an appreciable time. In certain conversions such, for example, as in certain oxidation processes, a very short and uniform contact of the reactants with the catalyst is necessary in order to avoid excessive production of side reaction products. In such cases catalysts substantially devoid of fine pores are superior. For the preparation of such catalysts, such material as crushed brick, pumice, asbestos, corundum, "Alundum," "Tabular Corundum," "Vicor Glass" and the like are used. These materials may indeed be and usually are porous but the pores are relatively large and few and insufficient to afford an available surface of more than at most a few square meters per gram. In contrast with such materials, the above-mentioned adsorptive supports such as activated alumina, silica gel, activated carbon and the like afford available surfaces of at least 30 square meters per gram and usually above 100 square meters per gram.

The present invention relates to the execution of catalytic conversions with catalysts of the first-described high surface type. For the preparation of various catalysts of this type a great number of substances having large available surfaces have been used or suggested as carriers or supports. Of the numerous carrier materials available, alumina, due to its marked superiority in certain respects, is a particularly excellent carrier. It is widely used to support catalytic agents of the most varied types. The superiority of alumina over most other carrier materials is due largely to its superior stabilizing and promoting properties in combination with a large inner surface, moderately good thermal stability, and availability. Alumina, it is found, is especially effective in stabilizing the activity of catalytic promoters deposited thereon. According to A. Mittasch and E. Keunecke [Z. Elektrochem 38, 666 (1932)], the stabilizing effect of alumina is due primarily to the fact that the somewhat porous interlayers of alumina prevent the recrystallization or sintering of the active catalyst. It has recently been found that alumina carriers frequently act as true catalyst promoters for many catalytic agents, such in particular as metal oxides. An excellent example of such promotion is, for instance, the promotion of chromium oxide by alumina. Chromium oxide deposited on active alumina is over twice as active as the same chromium oxide deposited upon silica gel, notwithstanding the fact that the inner surface of the silica gel is much larger than that of the active alumina.

Although alumina is recognized as a catalyst for a number of conversions and is an excellent carrier for a large variety of catalytic promoters, it is well known that all aluminas are not equivalent and that some are unsuitable for this type of catalyst. The aluminas employed as supports in this type of catalyst are invariably activated, i. e. adsorptive, aluminas. Precipitated aluminas contain considerable amounts of combined water and have little or no available inner surface. By suitably heating the alumina to drive out a portion of the water, small pores are opened up in the interior, and the alumina becomes adsorptive. It is then said to be activated. Alpha alumina, for example, which is the corundum form, contains little or no inner surface, cannot be activated, and is entirely unsuitable for this type of catalyst. On the other hand, these properties make it ideally suited for catalysts of the described low-surface type.

Suitable adsorptive aluminas may be prepared from the gamma aluminas of the Haber system. Haber [Naturwiss 13, 1007 (1925)] classifies the various forms of alumina into two systems designated by him as the gamma and beta systems, according to their behavior upon heating. The gamma aluminas of the Haber classification comprises gamma alumina and all of the so-called hydrated aluminas which, upon heating, are converted to alpha alumina through the gamma form. The beta aluminas of the Haber system of classification comprise those aluminas such as diaspore which, upon heating, are converted directly to alpha alumina without going through the gamma form. The classification of aluminas into two systems, designated gamma and beta, according to Haber, is not to be confused with the fundamental true alumina forms. This classification is merely for the purpose of dividing the common forms of alumina into two distinct groups. Thus, the various so-called hydrated aluminas which are classified as belonging to the gamma system in the Haber classifications are totally distinct from the true gamma alumina, and diaspore is not a beta alumina. The aluminas which upon heating are converted into alpha alumina through gamma alumina and belong to the gamma system of the Haber classification are:

The alumina alpha trihydrate, known as gibbsite or hydrargillite. This form is readily prepared synthetically and occurs in nature in the mineral, gibbsite, and as a component of certain bauxites;

The alumina beta trihydrate, known also as bayerite. It is isomorphous with hydrargillite. It does not occur naturally, but may be prepared synthetically by proper control of the precipitation conditions;

The alumina alpha monohydrate, known as böhmite. This alumina is formed by the partial dehydration of either of the above two trihydrates;

Gamma alumina. This is a meta-stable anhydrous oxide which does not occur naturally, but may be prepared by carefully controlled dehydration of any of the first three mentioned hydrates;

Gelatinous aluminum hydroxide. This frequently encountered alumina is amorphous when freshly precipitated, but after aging the characteristic lines of böhmite can be detected by X-ray analysis. On further aging, the precipitate is gradually transformed to bayerite and finally to hydrargillite;

Bauxite. This ore is of varied composition. The term "bauxite" was used in the older literature to designate the dihydrate. It is now known that bauxite consists of an extremely finely divided mixture of two or more of the known aluminas and certain argillaceous residues. No dihydrates of aluminas have ever been observed.

The adsorptive alumina, when impregnated with the catalytic material, usually exists essentially in the form of alumina alpha monohydrate or gamma alumina or a mixture of the two. During use the alumina alpha monohydrate, if this is employed in preparing the catalyst, is converted to gamma alumina. This transformation is, however, in no way detrimental. Thus, the alumina in such high surface catalysts may be considered to be largely, if not essentially, in the form of gamma alumina.

Catalysts of the type in question, where used in the conversion of carbonaceous reactants at elevated temperatures, have an active life of only a few hours. This is due to clogging of the fine pores with carbonaceous desposits. This is a serious disadvantage and many attempts have been made to improve the catalysts in this respect. A measure of success has been achieved in some cases by rendering the catalyst basic through the incorporation of a small amount of a free alkali. It is not known why or how the alkali is effective, but it is observed that the presence of a small amount of free alkali in some cases decreases the rate at which carbonaceous deposits are accumulated on the catalyst and thereby increases the life of the catalyst. This phenomenon is made use of in the catalysts described in U. S. Patents 2,320,118, 2,231,446, 2,249,337, 2,257,082, 2,271,751, 2,279,198, 2,206,377, and 2,337,190, as well as various others. One explanation of the phenomenon which is probably correct is that given in U. S. Patent 2,320,118. According to this explanation, the alumina has spots or centers which are particularly active for the cracking and/or polymerization reactions causing the carbonaceous deposits. The alkali is more or less selectively adsorbed on the surface at these spots or centers, probably due to a slightly more acidic nature, and tends to suppress their undesired activity.

The presence of free alkali and particularly potassium oxide in catalysts of this type also sometimes has the advantage that it makes the regeneration (i. e. the removal of the carbonaceous deposits) easier. This is particularly the case in the few instances where steam is employed as the regeneration medium.

The various alkaline materials are not equivalent for the above-mentioned purposes. The alkaline earth compounds as a class are less effective than sodium or potassium compounds, but are sometimes chosen because they generally have a less harmful effect on the desired activity of the catalyst. In the alkali metal compounds the effectiveness, as a rule, decreases with decreasing molecular weight.

While free alkali in the catalyst sometimes has a beneficial effect, the use of free alkali is not of general applicability because in many cases the beneficial effect is outweighed by detrimental effects, particularly on the desired activity of the catalyst. While there are a few cases where alkali may act as a promoter, the alkalis in general act as a weak depressor and, in many cases, as a strong poison.

The effects of alkali described are caused by the presence of free alkali in the catalyst and are noted when the alkali is incorporated in the catalyst either before or after depositing the catalytic promoter on the adsorptive support.

When the catalysts of the type in question eventually become inactive due to the accumulation of carbonaceous deposits, they are generally reactivated by carefully burning away the carbonaceous deposits. In most cases, and particularly where "dirty" or impure materials such as cracked gasoline are treated, these catalysts are never allowed to become completely deactivated but are maintained at a relatively high activity by frequent reactivation. This is the case in the so-called short cycle regenerative processes, such as hydroforming. However, with the possible exception of the first few reactivations, the reactivation does not effect a complete restoration of the original activity. This is due to the fact that these catalysts not only become deactivated in use through the deposition of carbonaceous deposits, but also undergo a continuous loss of efficiency which has been found to be caused by an allotropic change in the alumina. This change takes place relatively slowly compared to the rate of deposition of carbonaceous deposits and is therefore not determinative of the catalyst life; however, it does result in an impairment of the efficiency and becomes more important with the number of reactivations of the catalyst.

This cause of loss of efficiency was hardly to be expected since the alumina itself is known to be quite stable. Tests have shown conclusively that the adsorptive alumina itself may be heated to at least 1000° C. for at least 12 hours without any appreciable conversion to alpha alumina. In the use of the catalyst, on the other hand, temperatures above 800° C. are very seldom encountered and in nearly all cases the maximum temperatures encountered are below 700° C.

It has now been found that the allotropic change in the alumina which results in loss of catalyst efficiency is caused to take place at quite low temperatures by a catalytic effect of the promoter in the catalyst. The undesired allotropic change in the alumina (transformation to alpha alumina) is catalyzed by compounds of heavy metals of variable valence and particularly such of these as are isomorphous with alpha alumina. Thus, the oxides of Cr, Mn, Fe, Co are particularly active in catalyzing this transformation. We have found that this undesired transformation is also accelerated by acids such, in particular, as vapors of molybdenum oxide ($MoO_3$). The stability of gamma alumina at 1000° C. noted above is in agreement with the results of most prior investigations. In the few cases where conversions to alpha alumina at lower temperatures have been reported the conversion was undoubtedly accelerated by traces of iron or other impurities which catalyze this transformation.

The effects of traces of impurities in the alumina are indicated in the following table showing the results obtained on heating three substantially pure gamma aluminas at 1050° C. for 6 hours.

Table I

Alumina I—A very slight amount of alpha alumina was formed.
Alumina II—About one-third of the alumina was converted to alpha alumina.
Alumina III—The alumina was largely converted to alpha alumina.

The effects of certain catalytic promoters, commonly employed on an alumina base, in catalyzing the undesired transformation of gamma alumina to alpha alumina are illustrated in the following examples.

Example I

A commercial chrome-alumina catalyst consisting essentially of pellets of activated gamma alumina impregnated with chromium oxide (9.7% Cr) was heated at 1050° C. for 6 hours. The alumina was completely converted to alpha alumina.

Example II

A portion of the activated alumina II above was impregnated with ferric nitrate, dried, calcined to produce the iron oxide (5% FeO), and then finally heated at 1050° C. for 6 hours. The alumina was completely converted to alpha alumina.

Example III

A portion of the activated alumina I above was impregnated with ammonium molybdate, dried, calcined to produce molybdenum oxide (8% Mo), and finally heated at 1050° C. for 6 hours. The alumina was completely converted to alpha alumina.

Example IV

A portion of the activated alumina I above was impregnated with manganous nitrate, dried, calcined to produce manganese oxide, and finally heated at 1050° C. for 6 hours. All of the alumina was converted to alpha alumina except for a very small amount which reacted to form a spinel.

Example V

A portion of the activated alumina I was impregnated with cobaltous nitrate, dried, calcined to produce cobalt oxide, and finally heated at 1050° C. for 6 hours. All of the alumina was converted to alpha alumina except for some which reacted to form a spinel.

We have now found that various catalytic conversions and particularly hydrocarbon conversions carried out at elevated temperatures may be improved if, in place of the above-described conventional high-surface alumina-base catalysts, special high-surface alumina-base catalysts prepared as hereinafter described are used.

The catalysts used according to the present invention are prepared starting with an activated or activatable alumina base. Thus, we may start with any of the aluminas of the above-explained Haber system. The alumina employed is preferably substantially free of impurities such, in particular, as iron. In view of their greater purity the synthetically produced aluminas are generally most suitable. In some cases where the alumina is not adsorptive, as in the case with alumina alpha trihydrate and alumina beta trihydrate, it is advantageous to first render it adsorptive by activation in the known manner. The activation may be carried to the point where the alumina is essentially all converted to gamma alumina, i. e. a water content of about 1%–2%. It is preferable, however, not to carry the activation this far. Thus, a better distribution of the lithium oxide may be obtained when the activation is carried to a water content of about 6%–15%.

By employing a granular activated (adsorptive) alumina, the catalyst may be prepared in the form of granules or fragments of suitable size without crushing or pelleting. In such cases where the alumina is finely divided, it may, if desired, be pelleted prior to further treatment. Also, the alumina may be finely divided during the further treatment and subsequently pelleted. This last-mentioned method gives, in general, catalysts having superior mechanical strength.

In most cases it is desirable to treat the alumina, preferably in the activated form, to remove small amounts of soluble salts such, in particular, as the sodium salts sometimes occluded in the alumina prepared by precipitation from sodium aluminate solutions. This may be effected in some cases by subjecting the alumina to a thorough water washing. A more effective method is, however, to wash the alumina with a dilute acid solution. Although such acids as phosphoric acid and sulfuric acid may be used, such acids as hydrochloric acid, nitric acid, acetic acid, and hydrofluoric acid are generally more suitable. A still more effective method is to wash the alumina with a dilute (for example, 0.2 N) solution of an acid salt decomposable by heat. Suitable acid salts are, for instance, the nitrates of zirconium and aluminum. In this method traces of soluble impurities are quickly replaced by traces of the applied salt, which upon subsequent drying and heating are converted to the corresponding non-detrimental oxides while the anion components are volatilized. The treatment may be conveniently effected by placing the alumina in a suitable tower and allowing the acid solution to pass slowly through the mass at ordinary temperatures. No appreciable solution of the alumina need take place.

The alumina, preferably in a purified and activated form, is brought into intimate contact with a lithium compound which, upon heating in air, may be converted to lithium oxide. This is advantageously effected by impregnating the alumina with a solution of lithium compound and then drying, whereby the lithium compound is uniformly distributed over the available surface of the alumina. It is also possible to combine the alumina and lithium compound in intimate admixture by other methods such as by fine co-grinding or by precipitating the alumina in the presence of a suitable concentration of the lithium compound. Suitable lithium compounds are, for example, the hydroxide, nitrate and acetate. Other compounds such as lithium citrate, lithium nitrate, lithium formate, lithium peroxide, lithium oxalate, lithium aluminate and lithium cyanide, however, may be also suitably employed.

The amount of lithium added to the alumina is at least 0.23% by weight and preferably considerably more. For reasons which will become apparent, the upper limit to the amount is not critical. The preferred amount is between about 0.9% and about 2.6%. In most cases it requires two separate impregnation steps to incorporate the preferred amount of lithium.

The alumina containing the free lithium compound or oxide is next subjected to a relatively drastic but controlled heat treatment under conditions causing the lithium oxide to react with the alumina to convert at least the surface to a lithium spinel of the formula, $Li_2O \cdot 5Al_2O_3$. This reaction takes place slowly on the surface of the alumina, gradually penetrating deeper as the reaction time is increased. At temperatures above about 700° C. the conversion takes place at practical rates. From the standpoint of reaction rate it would be desirable to use very high temperatures, for instance, 1200° C. However, at such temperatures the alumina tends to undergo a considerable loss of surface due to sintering. The reaction is therefore carried out at a temperature at which there is a small or minimum loss of surface. The optimum temperature may vary somewhat, depending upon the original surface area of the alumina and the concentration of lithium present. Generally, however, temperatures of about 800° C. to 1000° C. are quite suitable.

The time required to effect the reaction depends not only upon the particular temperature but also upon the concentration of lithium present, the intimacy of the mixture of the alumina and the lithium compound, the surface area of the alumina, and the degree of conversion desired. By employing a substantial excess of lithium (for instance, 5% Li) in intimate contact with the alumina, it is possible, when using high temperatures, to obtain a surface layer of the lithium spinel in a relatively short time, for example 1 to 5 hours at 1000° C. On the other hand, at lower temperatures and with smaller quantities of lithium, the required time of heating is greatly prolonged. Generally, very satisfactory results may be obtained, using the above-described preferred agents, concentrations, etc., by heating at about 900° C. to 950° C. for 4 to 16 hours.

As pointed out, the reaction takes place slowly. Furthermore, the rate slows down as the reaction penetrates into the alumina. Because of this, it is not feasible to effect complete reaction of the lithium oxide. Consequently, the alumina, after the described heat treatment contains free (uncombined) lithium oxide.

The alumina having its surface converted to the lithium spinel and containing free lithium oxide is next subjected to a thorough washing treatment to remove the uncombined lithium. This may be effected by a prolonged washing with water or washing with an acid (for instance, sulfamic acid) in much the same manner as described above for removing sodium or other soluble salts from the alumina. It is to be pointed out that the lithium spinel is insoluble in water and in acids; consequently, the lithium which has reacted with the alumina and is present in the form of the spinel is not leached out by water or acid, as is free uncombined lithium oxide. Also, it does not affect the catalyst in the manner described above.

After the alumina has been washed free of uncombined lithium the carrier, now consisting of the adsorptive alumina having the surface converted to the lithium spinel, is impregnated with the desired catalyst (promoter) which it is desired to support. This may be done, preferably after drying, in any of the various known manners conventionally used in the preparation of such catalyst with the hitherto-used high surface alumina. For example, the alumina, after drying, may be impregnated with a solution of ammonium molybdate, dried, calcined at 500° C., and then reduced in a stream of hydrogen at 375° C. Other suitable methods are described in U. S. Patent 2,172,534.

As pointed out above, the various metals and metal compounds commonly employed with alumina in catalysis often catalyze the transformation of gamma alumina to alpha alumina. In view of the tendency for such agents to catalyze this transformation, the presence of the promoter during the preparation of the lithium spinel is undesirable. As pointed out, the preparation of the lithium spinel is executed at relatively high temperatures. When promoters which catalyze the transformation of gamma alumina to alpha alumina are present in appreciable concentrations, this conversion may take place in preference to the desired conversion to the lithium spinel. Thus, although tne product may contain some lithium spinel, it may contain large amounts of alpha alumina and may be relatively inactive and unsuitable. For the reasons just explained, the desired metal promoters are preferably incorporated in the catalyst after the conversion to the lithium spinel and not before.

The alumina carrier prepared as above described may be advantageously employed in place of ordinary active alumina in various supported alumina-base catalysts. Any of the catalytically active promoters conventionally applied to ordinary active alumina may be employed with the improved alumina base. Thus, a few representative promoters are the oxides, chromates, chromites, molybdates, tungstates, vanadates, phophates, phosphites, borates and sulfides of the metals of the transition series, particularly those belonging to groups IV to VIII of the periodic system of the elements. Particularly suitable catalysts comprise the metal oxides, and especially those exhibiting dehydrogenating activity. The present alumina base is also particularly advantageous when the catalyst contains one or more catalytic promoters which are isomorphous with alpha alumina.

The above-described catalysts may be prepared in any form suitable for use in various catalytic processes. Thus, they may be prepared in the form of fragments suitable for use in fixed beds or in the form of powders very suitable for use in the so-called "fluid catalyst system of operation." In view of their ability to withstand high temperatures they are especially suited for this latter type of process. Also, they may be prepared in the form of powders and then pelleted (with or without inert or extending materials) preferably with a conventional binding material.

The alumina base prepared as above described retains the mentioned desirable properties and characteristics of the hitherto-employed activated alumina alpha monohydrate and gamma alumina. From the physical standpoint it has, when properly prepared, a large internal surface and good mechanical strength. Thus, suitable alumina bases prepared as described possess an available surface area above 30 square meters per gram. For instance, very active alumina bases have been prepared according to the described method having available surface areas (as measured by adsorption) in the order of 50 square meters per gram. In most cases the adsorptive ability of the alumina base so prepared is somewhat lower than that of the original alumina, due presumably to some growth of the crystallites during the reaction at the relatively high temperatures employed. With proper care to insure intimate contact of the lithium compound and the alumina and to avoid overheating, the loss of surface may be maintained, however, at a negligible minimum. From the standpoint of catalytic action, they exert activity similar to ordinary active alumina and exert a similar stabilizing and promoting effect upon the catalytic activities of the usual catalytic agents customarily employed with alumina. Thus, the improved alumina may be employed per se as a catalyst for the reaction of hydrogen sulfide with olefins to produce thiophenic compounds, the dehydration of alcohols, the reforming of Fischer-Tropsch gasolines, the desulfurization of petroleum fractions, the isomerization of olefins, and related processes. For the isomerization of olefins it is, however, much improved by impregnating it with sulfamic acid.

The described catalyst may be also advantageously applied in the very wide variety of processes and catalytic conversions in which alumina-base catalysts are suitably employed. They are useful in the execution of such processes as the dehydrogenation of dehydrogenatable organic compounds, the dehydrocyclization of paraffin hydrocarbons having six or more carbon atoms, the desulfurization of sulfur-bearing hydrocarbon fractions, the oxidation of organic compounds, the hydrogenation of organic compounds, the dehydration of alcohols, etc., the Deacon and related processes, high temperature chlorination processes, and the like. They are particularly useful and advantageous in such of these and related processes where relatively high temperatures (for example, above 600° F.) and/or steam are encountered. Thus, they are particularly useful and advantageous in such processes wherein the catalyst is periodically regenerated by burning off combustible deposits.

By way of example, the dehydrogenation of hydrocarbons such as propane, butylene, butane, pentane, cyclopentane, cyclohexane, methyl cyclohexane, gasoline fractions, and the like with the catalysts described in detail in U. S. Patent 2,184,235 may be considerably improved by employing the improved catalysts prepared as described above. When the supported promoter is molybdenum oxide, the catalyst is particularly useful for hydroforming. In hydroforming part of the improvement in octane number is obtained through isomerization. Isomerization is promoted by acid catalysts and is inhibited by alkalis. In the present catalysts the surface is free of water-soluble alkali and may be acid. Thus, when the unreacted (water-soluble) lithium is removed using an acid medium the resulting spinel surface is acidic. In some cases it is advantageous to insure an acid surface by the incorporation of a small amount of a suitable acid with the promoter. Other examples of useful catalyst combinations are, for instance, those in which the promoter is boric acid, silico-tungstic acid, silicic acid, aluminum chloride, nickel sulfide, and sulfamic acid. When boric acid is the promoter the catalyst exhibits a good catalytic activity for the isomerization of olefins and hydrogen transfer between olefins and naphthenes. With silico-tungstic acid as the promoter, a particularly good catalyst for the hydration of olefins may be prepared. When a minor amount of silicic acid is incorporated in the spinel surface a fair cracking catalyst results. When the lithium-aluminum spinel is impregnated with nickel sulfide (for example, as described in U. S. Patent 2,298,346) the catalyst is excellent for the selective desulfurization of cracked gasoline. The aluminum chloride catalyst is useful in the isomerization of paraffins, but offers no particular advantage in this process.

Example VI

A portion of the activated alumina III above was impregnated with lithium nitrate and dried. The lithium content corresponded to 3% $Li_2O$. The material was then heated at 1050° C. for 6 hours. The gamma alumina was largely reacted to form the described lithium-alumina spinel and no alpha alumina was formed.

Example VII

Portions of pellets of active gamma alumina were treated to remove traces of sodium salts as described above, impregnated with amounts of $LiNO_3$ corresponding to 5%, 3%, 2% and 0.5% $Li_2O$, and then heated at 1050° C. for 6 hours. The portions containing 2% or more $Li_2O$ were converted largely to the lithium spinel and no alpha alumina was formed.

The portion containing 0.5% $Li_2O$ gave a somewhat different diffraction pattern. It contained many lines of the lithium spinel and also a number of other lines which are not accounted for. These extra lines may have been due to so-called zeta alumina. Very little, if any, alpha alumina was, however, formed. While a surface layer of the lithium spinel corresponding to as little as 0.5% $Li_2O$ is sufficient to affect a noticeable improvement in the stability of gamma alumina per se, larger amounts are required to stabilize catalysts containing promoters.

Example VIII

Pellets of gamma alumina were treated to remove traces of sodium salts as described above, impregnated with a 9.3 molar solution of lithium nitrate, and dried at 120° C. The pellets were then divided into three portions which were given the following heat treatments:

| Portion | Temperature | Time |
|---|---|---|
| | °C. | Hours |
| 1 | 500 | 1 |
| 2 | 500 +800 | 1 6 |
| 3 | 500 +1,000 | 1 6 |

The portions were then impregnated with molybdenum oxide in the usual manner. After reducing in hydrogen for 1 hour at 490° C., they were tested in the conversion of methyl cyclohexane to toluene under the following standardized test conditions:

Temperature _____°C__ 490  
Pressure _____atm__ 20  
Liquid hourly space velocity_____ 0.24  
Mol ratio of added gas (50% hydrogen and 50% natural gas) to hydrocarbon feed___ 5:1

The conversions (mol per cent of toluene in the liquid product) were as follows:

| Portion | Conversion |
|---|---|
| | Per cent |
| 1 | 18 |
| 2 | 64 |
| 3 | 64 |

This example illustrates the detrimental effect of free uncombined lithium on the catalytic activity of catalysts of this type. Thus, the portion heated at 500° C. for 1 hour contained the lithium in the uncombined state. In the portions subjected to a more severe heat treatment, the concentration of uncombined lithium was considerably less and, consequently, the poisoning effect was reduced. As illustrated in other following examples, the activity is still further increased when the uncombined lithium is removed as described. This poisoning effect of free lithium oxide is much more pronounced in the case of certain other catalysts such as those promoted by chromium oxide.

The specific catalytic activity of the portion heated at 1000° C. for 6 hours was very high. Thus, the activity per square meter of surface area was about 1.7, whereas in the standard commercial catalyst prepared with the same alumina without the lithium or the heat treatment the activity per square meter of surface was about 0.95.

Example IX

Pellets of gamma alumina were treated to remove traces of sodium salts as described above, impregnated with an amount of lithium nitrate corresponding to about 1.72% $Li_2O$, and then heated at 800° C. for 118½ hours to form the lithium-alumina spinel. A portion of the material was washed with a solution of aluminum nitrate to remove uncombined lithium. The materials were then impregnated with molybdenum oxide in the usual way (about 8% Mo) and after reducing in hydrogen for 1 hour at 490° C. they were used for the conversion of methyl cylohexane to toluene in the above-described standardized test. The conversion obtained with the material from which the uncombined lithium was not removed was only 70%. The conversion obtained with the material from which the uncombined lithium was removed was 79%.

Example X

Portions of pellets of gamma alumina were treated to remove traces of sodium salts as described above, and then impregnated with an amount of lithium nitrate equivalent to about 2.6% Li$_2$O. The portions were given the following heat treatments:

| Portion | Temperature | Time |
|---|---|---|
| | °C. | Hours |
| 1 | 700 | 95 |
| 2 | 800 | 120 |
| 3 | 1,000 | 7 |

These portions were then thoroughly washed with a dilute solution of aluminum nitrate to remove uncombined lithium. They were then impregnated with molybdenum oxide in the usual manner, reduced with hydrogen for 1 hour at 490° C., and used in the above-described standard test. The conversions obtained were as follows:

| Portion | Conversion |
|---|---|
| | Per cent |
| 1 | 81 |
| 2 | 84 |
| 3 | 50 |

The lower activity of the catalyst in which the lithium spinel was prepared at 1000° C. was due to loss in surface area during the preparation and was not due to the formation of alpha alumina. This catalyst had an available surface of only about 33.5 square meters per gram.

We claim as our invention:

1. A process for the production of an improved catalyst of the type in which a catalytically active promoter is supported on the surface of an adsorptive support which comprises the combination steps of depositing at least 0.5% of lithium oxide on the surface of an adsorptive alumina, reacting the deposited lithium oxide with the alumina at a temperature above 700° C. but below that causing fusion for a time sufficient to convert at least the surface into lithium-aluminum compound of the formula, Li$_2$O·5Al$_2$O$_3$, washing the resultant product until all free lithium oxide is removed, and then incorporating a catalytically active promoter on the said lithium-aluminum compound surface.

2. Process according to claim 1 in which between 0.9% and 2.6% of lithium oxide is deposited on the surface of the adsorptive alumina.

3. Process according to claim 1 in which the adsorptive alumina has a water content between about 6% and 15%.

4. Process according to claim 1 in which the adsorptive alumina is washed free of soluble alkali salts prior to incorporating the lithium oxide.

5. Process according to claim 1 in which the said catalytically active promoter is an acid compound.

6. Process according to claim 1 in which the said catalytically active promoter is a dehydrogenating compound of a metal capable of existing in more than one state of valence.

7. Process according to claim 1 in which the said catalytically active promoter is a metal oxide which is isomorphous with alpha alumina.

8. A solid aluminous-base catalyst consisting of a compound of a metal capable of existing in more than one state of valence supported upon an adsorptive aluminous base material having a preformed surface of lithium-aluminum compound of the formula, Li$_2$O·5Al$_2$O$_3$, said catalyst analyzing at least 0.5% Li$_2$O and being free of water-soluble lithium.

9. A solid aluminous base catalyst consisting essentially of an oxide of a metal capable of existing in more than one state of valence supported upon an adsorptive aluminous base material having a preformed surface of lithium-aluminum compound of the formula, Li$_2$O·5Al$_2$O$_3$, said catalyst analyzing at least 0.5% Li$_2$O and being free of water-soluble lithium.

10. A solid aluminous base catalyst consisting essentially of an oxide of a metal which is isomorphous with alpha alumina supported upon an adsorptive aluminous base material having a preformed surface of lithium-aluminum compound of the formula, Li$_2$O·5Al$_2$O$_3$, said catalyst analyzing at least 0.5% Li$_2$O and being free of water-soluble lithium.

11. A solid catalyst consisting of silico-tungstic acid supported upon an adsorptive aluminous base material having a preformed surface of lithium-aluminum compound of the formula, Li$_2$O·5Al$_2$O$_3$, said catalyst analyzing at least 0.5% Li$_2$O and being free of water-soluble lithium.

12. A solid catalyst consisting of sulfamic acid supported upon an adsorptive aluminous base material having a preformed surface of lithium-aluminum compound of the formula, Li$_2$O·5Al$_2$O$_3$, said catalyst analyzing at least 0.5% Li$_2$O and being free of water-soluble lithium.

13. In a process for effecting a catalytic conversion by contacting the material to be converted under conversion conditions with a solid catalytic promoter, the improvement which comprises contacting said material to be converted with said catalytic promoter while the latter is disposed on the extended surface of an adsorptive lithium-aluminum compound of the formula Li$_2$O·5Al$_2$O$_3$.

14. In a process for effecting dehydrogenation by contacting the material to be dehydrogenated under conversion conditions with a solid dehydrogenation catalyst, the improvement which comprises contacting said material to be dehydrogenated with said catalyst while the latter is disposed on the extended surface of an adsorptive lithium-aluminum compound of the formula Li$_2$O·5Al$_2$O$_3$, said lithium-aluminum compound surface being at least 30 m.$^2$/g. and substantially free of water soluble lithium.

15. A solid multi-component catalyst composite comprising as a carrier a preformed, adsorptive lithium-aluminum spinel of the formula Li$_2$O·5Al$_2$O$_3$, said compound having a surface of at least 30 m.$^2$/g. which is substantially free of water soluble lithium.

ALBERT E. SMITH.
OTTO A. BEECK.

REFERENCES CITED

The following references are of record in the file of this patent:

UNITED STATES PATENTS

| Number | Name | Date |
|---|---|---|
| 2,249,337 | Visser et al. | July 15, 1941 |
| 2,320,118 | Blaker | May 25, 1943 |
| 2,378,208 | Fuller et al. | June 12, 1945 |

OTHER REFERENCES

"Mineralogy," by Phillips, published by Macmillan, New York (1912).